(12) United States Patent
Chakera

(10) Patent No.: US 6,996,222 B2
(45) Date of Patent: Feb. 7, 2006

(54) CALL-ASSOCIATED DATA TRANSFER AMONG MULTIPLE TELECOMMUNICATION SWITCHES

(75) Inventor: Abbas Chakera, Uxbridge (GB)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 09/960,474

(22) Filed: Sep. 24, 2001

(65) Prior Publication Data

US 2003/0059019 A1    Mar. 27, 2003

(51) Int. Cl.
H04M 3/523    (2006.01)
H04M 3/58    (2006.01)

(52) U.S. Cl. .......................... 379/212.01; 379/265.02; 379/265.09

(58) Field of Classification Search ........... 379/211.02, 379/88.13, 265.02–265.11, 265.12, 45, 212.01, 379/265.09
See application file for complete search history.

(56) References Cited

U.S. PATENT DOCUMENTS

| | | | | |
|---|---|---|---|---|
| 4,942,602 A | * | 7/1990 | Baker et al. ........... | 379/212.01 |
| 5,335,268 A | * | 8/1994 | Kelly et al. ............. | 379/112.05 |
| 5,469,504 A | * | 11/1995 | Blaha ..................... | 379/265.11 |
| 6,229,888 B1 | * | 5/2001 | Miloslavsky ........... | 379/265.01 |

OTHER PUBLICATIONS

Brady, Pat. Oct. 1998. Virtual Help Desks Enhance Call Center Service. http://www.tmcnet.com/articles/ctimag/1098/apropos.htm.*
Brady, P. (Oct. 1998). Virtual Help Desks Enhance Call Center Service.*

* cited by examiner

Primary Examiner—Harry S. Hong
(74) Attorney, Agent, or Firm—Kevin A. Reif

(57) ABSTRACT

A telecommunication system includes a first type of telecommunication switch and a first server coupled to the telecommunication switch. The system further includes a second type of telecommunication switch and a second server coupled to the second type of telecommunication switch. A data network link coupled between the first server and the second server allows call-associated data to be transferred between servers when a telephone call is transferred from the first type of telecommunication switch to second type of telecommunication switch.

17 Claims, 2 Drawing Sheets

CALL-ASSOCIATED DATA TRANSFER AMONG MULTIPLE TELECOMMUNICATION SWITCHES

FIELD OF THE INVENTION

The present invention is directed to telecommunication systems. More particularly, the present invention is directed to call-associated data transfer among multiple telecommunication switches.

BACKGROUND INFORMATION

Call-associated data is frequently used to assist customer agents in call center environments. Examples of call-associated data include customer reference numbers or IDs, customer ordering history, customer credit information, and other details of a customer account.

In a typical scenario where call-associated data is used, a computer server is connected to a private branch exchange ("PBX") switch. When a telephone call is received by the PBX, the identity of the telephone call is determined through the use of, for example, automatic number identification ("ANI"). A database is then queried by the computer server and the call-associated data for the caller is retrieved. The call-associated data is then displayed at a computer terminal of the responsible customer agent. The customer agent can use the call-associated data to handle the telephone call more efficiently and effectively.

In some instances, a telephone call is made to one type of telephone switch and then transferred to another type. For example, a call can be made to a telephone on a Nortel Meridian 1 PBX switch, and then transferred to a telephone on an Avaya Definity G3 PBX switch. In this scenario, call-associated data may be retrieved for the telephone call to the first switch. However, there is no current known method or system to transfer that call-associated data to the second switch, or have the data available to a customer agent on the second switch. This is a problem because telephone calls are frequently transferred in call center facilities due to overflows or redirections of calls to other call center facilities.

Based on the foregoing, there is a need for a method and system to provide call-associated data that is generated on a call to a first type of telephone switch to a telephone connected to a second type of telephone switch.

DETAILED DESCRIPTION

One embodiment of the present invention is a telecommunication system that allows call-associated data that is generated from a telephone call to a first type of switch to be available to a computer terminal coupled to a second type of switch when the telephone call is transferred to the second type of switch.

Figure 1:
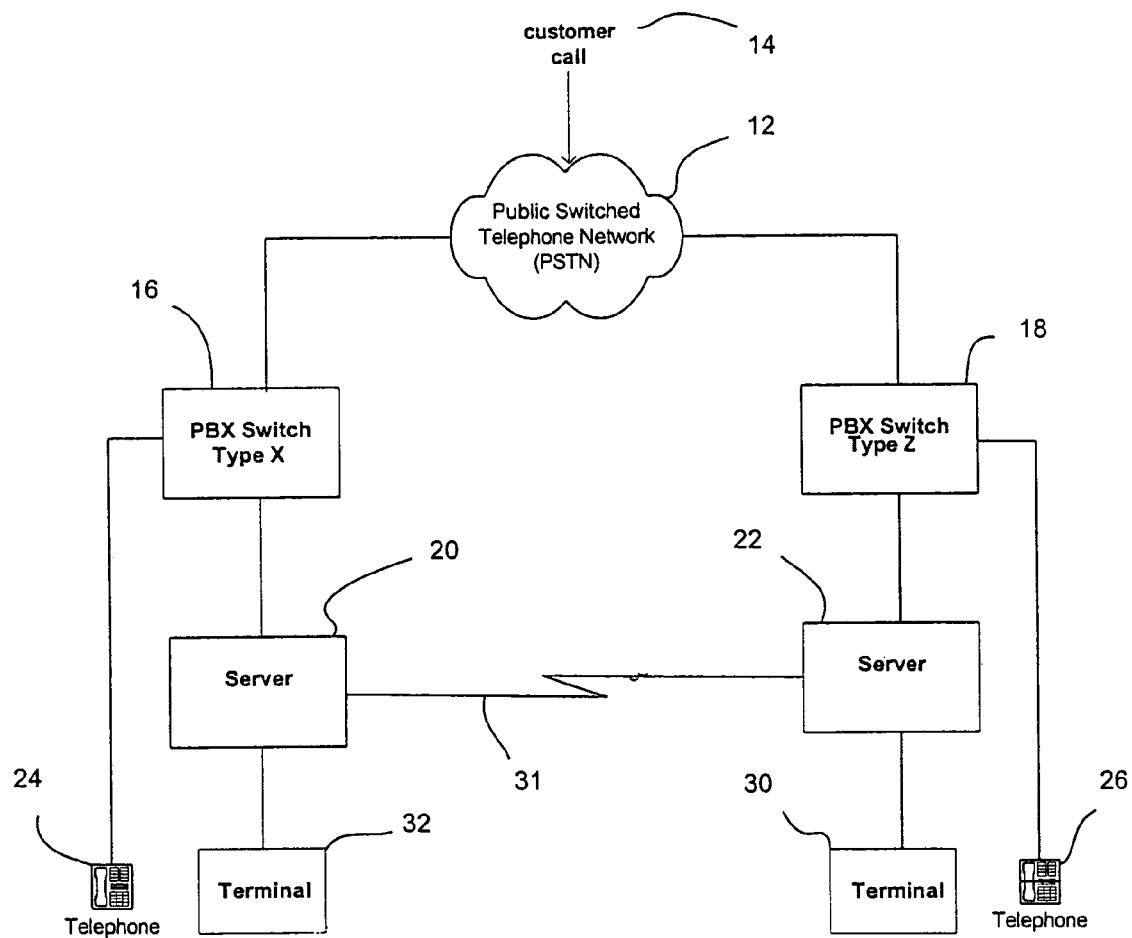
FIG. 1 is a block diagram of a telecommunication system in accordance with one embodiment of the present invention.

FIG. 1 is a block diagram of a telecommunication system 10 in accordance with one embodiment of the present invention. System 10 includes two different types of PBX switches: PBX switch 16 and PBX switch 18. Examples of types of PBX switches are the Nortel Meridian 1 PBX switch, the Avaya Definity G3 PBX switch, the Ericsson MD110 PBX switch.

Coupled to PBX switch 16 is a computer server 20, a telephone 24, and a computer terminal 32. Computer server 20 and terminal 32 are coupled to PBX switch 16 in a known manner to allow for computer telephony integration ("CTI"). With CTI, server 20 can retrieve call-associated data regarding a telephone call to PBX switch 16, and provide the call-associated data to a customer agent at terminal 32. Typically, each customer agent is provided with a screen "pop-up" on terminal 32 that provides the call-associated data for a telephone call received at a telephone 24.

In one embodiment, software to enable CTI is executed by server 20. Server 20 can be a general purpose computer that includes a processor, a storage system for storing software code and database information, and communication capability. In one embodiment, CT Connect Call Control Server Software V5.0, from Intel Corp., is executed by server 20.

PBX switches 16 and 18 are coupled to Public Switched Telephone Network ("PSTN") 12. A customer initiates a telephone call to PBX switch 16 or 18 on a telephone 14, or through any other known telecommunication device (e.g., computer, PDA, etc.).

PBX switch 18 is also coupled to a server 22, terminal 30 and telephone 26. These devices are also used to enable CTI of PBX switch 18. In one embodiment, CTI is also implemented by CT Connect Call Control Server Software V5.0, from Intel Corp., executed by server 22.

Each server 20 and 22 is connected via a data network link to its respective PBX switch 16 and 18. In one embodiment, the data network link is a TCP/IP protocol link. The link provides monitor and control access to the line side devices (e.g., telephone 24) on the PBX.

Servers 20 and 22 are also coupled together via a data network link 31. In one embodiment, data network link 31 is a Transmission Control Protocol/Internet Protocol ("TCP/IP") protocol link.

Figure 2:
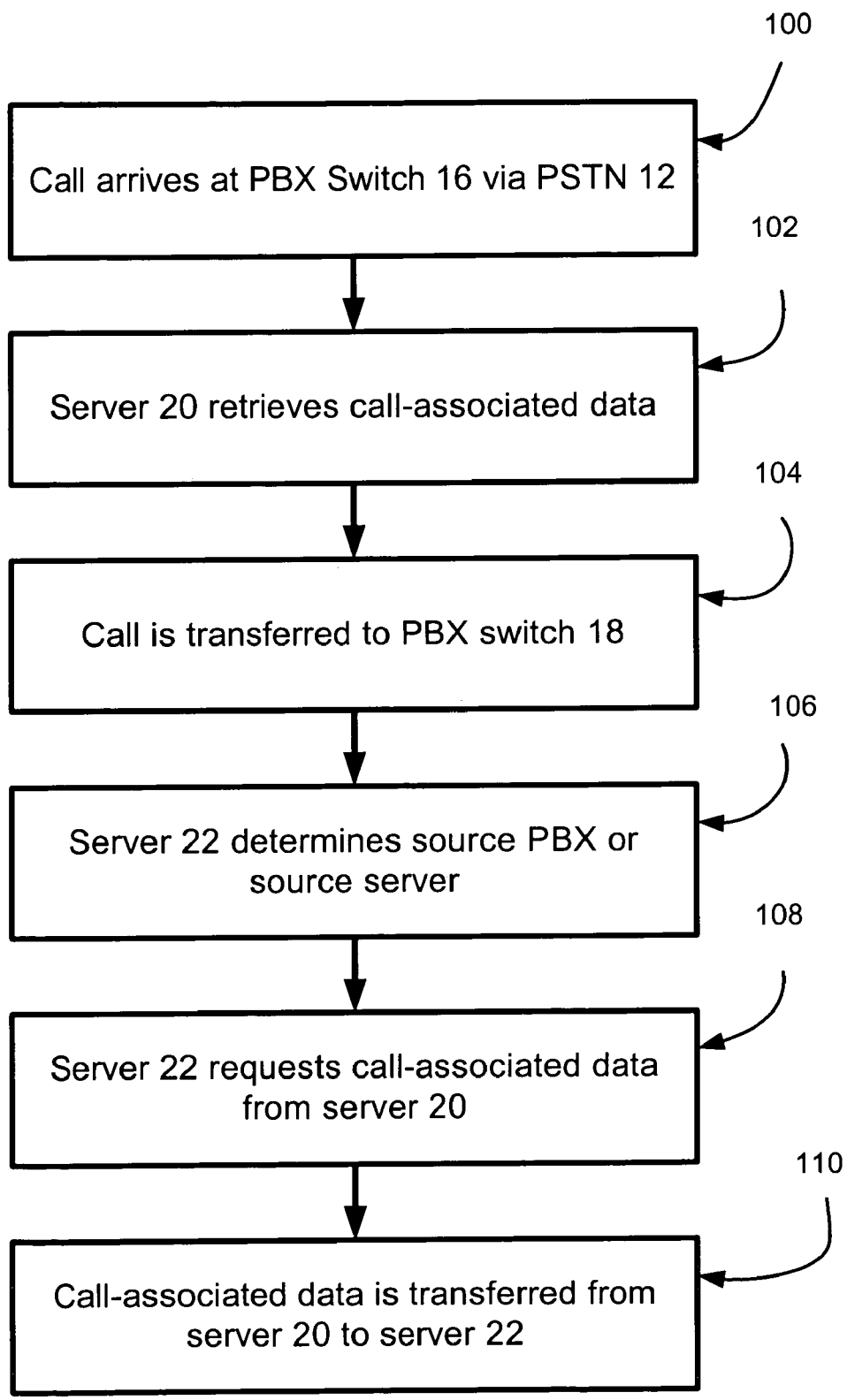
FIG. 2 is a flow chart illustrating steps performed by the telecommunication system in accordance with one embodiment of the present invention.

FIG. 2 is a flow chart illustrating steps performed by telecommunication system 10 in accordance with one embodiment of the present invention. In one embodiment, the steps are stored as software and executed by a processor. In other embodiments, the steps are performed by any combination of hardware or software.

At step 100, a telephone call arrives at PBX switch 16 via PSTN 12. The telephone call is intended for a customer agent coupled to server 20 at terminal 32. In other embodiments, the telephone call can arrive at PBX switch 16 via any known telecommunication method.

At step 102, server 20 retrieves call associated data regarding the incoming telephone call. In one embodiment, the identity of the telephone call is determined through the use of automatic number identification. A database is then queried based on the telephone call to retrieve the call-associated data.

At step 104, the telephone call is transferred to PBX switch 18. The call may be either transferred directly or via a queue in a known manner. Reasons for transferring the call may include the customer agent at terminal 32 being too busy to handle the call or otherwise unavailable.

At step 106, server 22 received notification of the transferred telephone call from PBX switch 18. Server 22 then determines the source of the transferred telephone call (i.e., PBX switch 16 and/or server 20). In one embodiment, server 22 determines the source of the telephone call from the area code prefix of the telephone call. For example, PBX switch 16 may be located in area code 616 and PBX switch 18 may be located in area code 717. If the telephone call originated from area code 616, server 22 knows it came from PBX switch 16.

At step 108, server 22 requests from server 20 the call-associated data for the telephone call that was retrieved by server 20.

Finally, at step 110, server 20 responds to the request by sending the retrieved call-associated data to server 22. In one embodiment, server 22 stores the call-associated data locally. Server 22 then makes the a call associated data available to a customer agent at terminal 30 when the agent is handling the telephone call.

As discussed, the telecommunication system in accordance with the present invention allows call-associated data retrieved in a telephone call to one type of telephone switch to be transferred to another type of telephone switch. This allows customer agents at disparate telephone switches to reap the benefits of the call-associated data.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A telecommunication system comprising:
   a first type of telecommunication switch;
   a first server coupled to said telecommunication switch, the first server to retrieve call-associated data comprising details of a customer account;
   a second type of telecommunication switch, to receive a call transferred from the first type of telecommunication switch;
   a second server coupled to said second type of telecommunication switch, said second server to determine a source of the transferred call as being the first server by an area code prefix; and
   a data network link coupled between said first server and said second server, the second server to request the call associated data from the first server.

2. The telecommunication system of claim 1, wherein the call-associated data is retrieved by said first server based on a telephone call to said first type of telecommunication switch.

3. The telecommunication system of claim 2, wherein said telephone call is received by said first type of telecommunication switch via a Public Switched Telephone Network.

4. The telecommunication system of claim 3, wherein said first server comprises a database, and said call-associated data is retrieved based on an automatic number identification of said telephone call.

5. The telecommunication system of claim 1, wherein said data network link is a Transmission Control Protocol/Internet Protocol link.

6. The telecommunication system of claim 1, wherein said first type of telecommunication switch and said second type of telecommunication switch are different types of private branch exchange switches.

7. The telecommunication system of claim 1, wherein said first server is coupled to said first type of telecommunication switch via computer telephony integration.

8. A method of receiving call-associated data of a telephone call received by a first type of telephone switch, said method comprising:
   retrieving call-associated data based on automatic number identification (ANI) of the telephone call by a first server connected to the first type of telephone switch;
   transferring the telephone call to a second type of telephone switch having a second server connected thereto;
   said second server determining a source of the transferred telephone call as being the first server by an area code prefix;
   requesting the call-associated data from a first server coupled to said first type of telephone switch, the call-associated data comprising details of a customer account; and
   receiving the call-associated data at a second server coupled to said second type of telephone switch.

9. The method of claim 8, wherein said call-associated data is received at said second server from said first server via a data network link.

10. The method of claim 9, wherein said data network link is a Transmission Control Protocol/Internet Protocol link.

11. The method of claim 8, wherein said first type of telecommunication switch and said second type of telecommunication switch are different types of private branch exchange switches.

12. The method of claim 8, wherein said first server is coupled to said first type of telecommunication switch via computer telephony integration.

13. The method of claim 8, said first server comprises a database, and said call-associated data is retrieved based on an automatic number identification of said telephone call.

14. A method of operating a telecommunication system comprising:
   receiving a telephone call at a first type of telephone switch;
   retrieving call-associated data about the telephone call at a first server coupled to said first type of telephone switch based on automatic number identification (ANI) of the telephone call;
   transferring the telephone call to a second type of telephone switch;
   determining a source of the telephone call at a second server coupled to said second type of telephone switch via an area code prefix; and
   requesting the call-associated data from said first server, the call-associated data comprising details of a customer account.

15. The method of claim 14, further comprising:
   receiving the call-associated data at said second server over a data network link coupled to said first server.

16. The method of claim 15, further comprising:
   storing the call-associated data at said second server.

17. The method of claim 14 wherein the details of a customer account comprises at least one of customer reference numbers, customer ordering history, and customer credit information.

* * * * *